US012617132B2

(12) United States Patent
Mitsuishi et al.

(10) Patent No.: US 12,617,132 B2
(45) Date of Patent: May 5, 2026

(54) FOAM-MOLDED PRODUCT, METHOD FOR MANUFACTURING FOAM-MOLDED PRODUCT, AND METHOD FOR SUPPRESSING APPEARANCE DEFECT OF FOAM-MOLDED PRODUCT

(71) Applicant: SHOWA DENKO MATERIALS CO., LTD., Tokyo (JP)

(72) Inventors: Naoko Mitsuishi, Tagawa (JP); Shingo Nakano, Tagawa (JP); Kouji Yamada, Tagawa (JP); Hiroaki Fujino, Tagawa (JP); Hirofumi Shiokawa, Tagawa (JP); Yoji Hirai, Tagawa (JP)

(73) Assignee: RESONAC CORPORATION, Tokyo (JP)

( * ) Notice: Subject to any disclaimer, the term of this patent is extended or adjusted under 35 U.S.C. 154(b) by 4 days.

(21) Appl. No.: 17/766,448

(22) PCT Filed: Oct. 6, 2020

(86) PCT No.: PCT/JP2020/037819
§ 371 (c)(1),
(2) Date: Apr. 4, 2022

(87) PCT Pub. No.: WO2021/070798
PCT Pub. Date: Apr. 15, 2021

(65) Prior Publication Data
US 2023/0025703 A1     Jan. 26, 2023

(30) Foreign Application Priority Data
Oct. 10, 2019     (JP) ................................. 2019-187117

(51) Int. Cl.
*B29C 44/06*          (2006.01)
*B29C 44/42*          (2006.01)
(Continued)

(52) U.S. Cl.
CPC .............. *B29C 44/06* (2013.01); *B29C 44/42* (2013.01); *B32B 5/145* (2013.01); *B32B 5/18* (2013.01);
(Continued)

(58) Field of Classification Search
CPC ..... B29C 44/06; B29C 44/42; B29C 44/0407; B29C 44/586; B29K 2023/12;
(Continued)

(56) References Cited

U.S. PATENT DOCUMENTS 5,997,781 A     12/1999  Nishikawa et al.
2002/0017734 A1     2/2002  Sugihara et al.
(Continued)

FOREIGN PATENT DOCUMENTS

EP          1 166 991          1/2002
EP          3 647 347          5/2020
(Continued)

OTHER PUBLICATIONS

Translation of JP-2006212952-A, Mogami et al., Aug. 17, 2006. (Year: 2006).*
(Continued)

*Primary Examiner* — Hai Vo
(74) *Attorney, Agent, or Firm* — Wenderoth, Lind & Ponack, L.L.P.

(57)          ABSTRACT

A foam-molded product including a foam layer, and a skin layer covering the foam layer, in which the maximum diameter of bubbles in the foam layer is 0.90 mm or less; and a method for manufacturing a foam-molded product and a method for suppressing an appearance defect of a foam-molded product, including an injection process and a foaming process, wherein the foam-molded product after molding includes a foam layer and a skin layer covering the foam layer, the skin layer having an average thickness of from 0.3
(Continued)

mm to 0.7 mm, and wherein expanding of the volume of the cavity includes performing a core-back process of the mold such that a thickness of the foam-molded product after molding is within ±0.2 mm of a predetermined target thickness.

10 Claims, 5 Drawing Sheets

(51) Int. Cl.

| | |
|---|---|
| *B29K 23/00* | (2006.01) |
| *B29L 31/30* | (2006.01) |
| *B32B 5/14* | (2006.01) |
| *B32B 5/18* | (2006.01) |
| *B32B 5/20* | (2006.01) |
| *B32B 27/06* | (2006.01) |

(52) U.S. Cl.
CPC ............. *B32B 5/20* (2013.01); *B32B 27/065* (2013.01); *B29K 2023/12* (2013.01); *B29L 2031/3005* (2013.01); *B32B 2266/0214* (2013.01); *B32B 2266/104* (2016.11); *B32B 2307/732* (2013.01); *B32B 2605/003* (2013.01)

(58) Field of Classification Search
CPC ...... B32B 2266/0214; B32B 2266/104; B32B 2307/732; B32B 27/065; B32B 5/18; B32B 2605/003; B29L 2031/3005; Y02P 90/02; Y02P 90/30
See application file for complete search history.

(56) References Cited

U.S. PATENT DOCUMENTS

| | | | |
|---|---|---|---|
| 2004/0013846 A1* | 1/2004 | Kugimiya ........... | B29C 44/0415 |
| | | | 428/318.6 |
| 2005/0003032 A1 | 1/2005 | Sugihara et al. | |
| 2005/0006805 A1 | 1/2005 | Sugihara et al. | |
| 2008/0190924 A1* | 8/2008 | Bobrov ............... | B29C 44/0407 |
| | | | 264/510 |
| 2012/0211912 A1* | 8/2012 | Kawaguchi ................ | C08J 9/32 |
| | | | 264/51 |
| 2013/0209784 A1 | 8/2013 | Nakagawa et al. | |
| 2013/0316247 A1* | 11/2013 | Kuma ........................ | C08J 5/18 |
| | | | 361/502 |
| 2015/0158989 A1* | 6/2015 | Cocquet .................... | C08J 9/02 |
| | | | 521/137 |
| 2017/0190085 A1* | 7/2017 | Suenaga ................. | B29C 44/12 |
| 2020/0123341 A1 | 4/2020 | Morio et al. | |

FOREIGN PATENT DOCUMENTS

| | | | | | |
|---|---|---|---|---|---|
| JP | 10-230528 | | 9/1998 | | |
| JP | 2002-079545 | | 3/2002 | | |
| JP | 2006212952 | A | * | 8/2006 | |
| JP | 2010-269512 | | 12/2010 | | |
| JP | 2012-111941 | | 6/2012 | | |
| JP | 2012-140532 | | 7/2012 | | |
| JP | 2014-121793 | | 7/2014 | | |
| WO | WO-2014038609 | A1 | * | 3/2014 | ............. B29C 44/10 |
| WO | 2019/004121 | | 1/2019 | | |

OTHER PUBLICATIONS

Translation of WO-2014038609-A1, Akimoto Hideo, May 9, 2013. (Year: 2013).*

* cited by examiner

FOAM-MOLDED PRODUCT, METHOD FOR MANUFACTURING FOAM-MOLDED PRODUCT, AND METHOD FOR SUPPRESSING APPEARANCE DEFECT OF FOAM-MOLDED PRODUCT

TECHNICAL FIELD

The present disclosure relates to a foam-molded product, a method for manufacturing a foam-molded product, and a method for suppressing an appearance defect of a foam-molded product.

BACKGROUND ART

Foam injection-molded products of thermoplastic resins such as polypropylene-based resins and acrylonitrile-butadiene-styrene copolymer-based resins are used for members of automobiles, from the viewpoint of their light weight and excellent rigidity. Examples of the foam injection molding method include a core-back method. The core-back method is a method in which injection molding is performed with a thermoplastic resin composition containing a foaming agent, filling the mold with the thermoplastic resin composition, followed by sliding a movable mold to expand the volume of the cavity, and obtaining a molded product. This molding method forms a non-foaming layer (a skin layer) at the outer part of the molded product and a foam layer in the inner part of the molded product (e.g., see Patent Document 1).

RELATED ART DOCUMENT

Patent Document

[Patent Document 1] Japanese Patent Application Laid-Open (JP-A) No. 2014-121793

SUMMARY OF INVENTION

Technical Problem

When foam injection-molded products are used as automobile interior parts such as console boxes, door trims, deck side trims, back door trims and instrument panels, or automobile exterior parts such as arch moldings, rocker moldings and side panels, the foam injection-molded products are desired to be lightweight and thin, and to have a good appearance.

However, foam injection-molded products are susceptible to appearance defects on the surface thereof, including small circular or elliptical dents (sometimes referred to as "pock marks") and linear marks formed on the surface of the molded products along the flow of the resin during the molding (sometimes referred to as "swirl marks"), which may cause problems in appearance. Pock marks are generated during foam injection molding when bubbles remain in the surface of the resin and rupture, and swirl marks are generated when the portions at which the bubbles have ruptured are dragged by the flow of the resin.

In view of the foregoing circumstances, the present disclosure is directed to providing a foam-molded product in which appearance defects such as pock marks or a swirl marks are suppressed, a method for manufacturing a foam-molded product that enables suppressing an appearance defect of the molded product, and a method for suppressing an appearance defect of a foam-molded product.

Solution to Problem

Means for solving the above-described problems include the following aspects.

(1) A foam-molded product, including a foam layer, and a skin layer covering the foam layer, wherein a maximum diameter of bubbles in the foam layer is 0.90 mm or less.

(2) The foam-molded product according to (1), wherein the skin layer has an average thickness of from 0.3 mm to 0.7 mm.

(3) The foam-molded product according to (1) or (2), wherein an average diameter of the hubbies in the foam layer is from 0.02 mm to 0.15 mm.

(4) A method for manufacturing a foam-molded product, the method including:

injecting a resin material into a cavity of a mold to fill the cavity with the resin material; and expanding a volume of the cavity to foam the resin material in the cavity, wherein:

the foam-molded product after molding includes a foam layer, and a skin layer covering the foam layer, the skin layer having an average thickness of from 0.3 mm to 0.7 mm, and the expanding of the volume of the cavity includes performing a core-back process of the mold such that a thickness of the foam-molded product after molding is within +0.2 mm of a predetermined target thickness.

(5) The method for manufacturing a foam-molded product according to (4), wherein the core-back process of the mold is performed such that the thickness of the foam-molded product after molding is within +0.2 mm of a predetermined target thickness, as a result of which a maximum diameter of the bubbles in the foam-molded product is 0.9 mm or less.

(6) The method for manufacturing a foam-molded product according to (4) or (5), wherein an average diameter of the bubbles in the foam layer is from 0.02 mm to 0.15 mm.

(7) A method for suppressing an appearance defect of a foam-molded product, the method including:

injecting a resin material into a cavity of a mold to fill the cavity with the resin material; and expanding a volume of the cavity to foam the resin material in the cavity, wherein:

the foam-molded product after molding includes a foam layer, and a skin layer covering the foam layer, the skin layer having an average thickness of from 0.3 mm to 0.7 mm, and the expanding of the volume of the cavity includes performing a core-back process of the mold such that a thickness of the foam-molded product after molding is within ±0.2 mm of a predetermined target thickness.

(8) The method for suppressing an appearance defect of a foam-molded product according to (7), wherein the core-back process of the mold is performed such that the thickness of the foam-molded product after molding is within ±0.2 mm of a predetermined target thickness, as a result of which a maximum diameter of the bubbles in the foam-molded product is 0.9 mm or less.

(9) The method for suppressing an appearance defect of a foam-molded product according to (7) or (8), wherein an average diameter of the bubbles in the foam layer is from 0.02 mm to 0.15 mm.

Advantageous Effects of Invention

According to the present disclosure, a foam-molded product in which appearance defects such as pock marks or swirl marks is suppressed, a method for manufacturing a foam-molded product that enables suppressing an appearance defect of the molded product, and a method for suppressing an appearance defect of a foam-molded product, are provided.

DESCRIPTION OF EMBODIMENTS

Figure 1A:
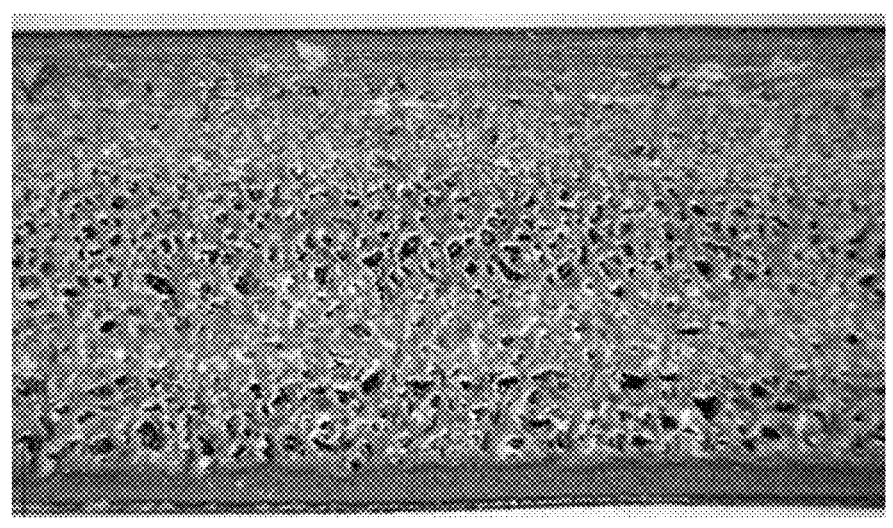
FIG. 1A is a cross-sectional view of a foam-molded product in an embodiment of the present disclosure.

Embodiments for carrying out the invention will be described below in detail. However, the invention is not limited to the following embodiments in the following embodiments, components (including elemental steps, etc.) thereof are not essential unless otherwise specified. The same applies to numerical values and ranges, which do not limit the invention.

In the present disclosure, the term "step" encompasses an independent step separated from other steps as well as a step that is not clearly separated from other steps, as long as a purpose of the step can be achieved.

In the present disclosure, a numerical range specified using "(from) . . . to . . . " represents a range including the numerical values noted before and after "to" as a minimum value and a maximum value, respectively.

In the numerical ranges described in a stepwise manner in the present disclosure, the upper limit value or the lower limit value described in one numerical range may be replaced with the upper limit value or the lower limit value of another numerical range described in a stepwise manner. Further, in the numerical ranges described in the present disclosure, the upper limit value or the lower limit value of the numerical ranges may be replaced with the values shown in the Examples.

In the present disclosure, each component may include plural substances corresponding to the component. In a case in which plural substances corresponding to respective components are present in a composition, an amount or content of each component in the composition means the total amount or content of the plural substances present in the composition unless otherwise specified.

The term "layer" or "film" as used herein encompasses, when a region in which the layer or the film is present is observed, not only a case in which the layer is formed over the entire observed region, but also a case in which the layer is formed at only a part of the observed region.

In a case in which embodiments are described herein with reference to the drawings, the configuration of the embodiments are not limited by the configuration illustrated in the drawings. The sizes of members in the drawings are conceptual, and the relative relationships between the sizes of the members are not limited thereto. In the drawings, members having substantially the same function may be denoted by the same reference signs, and redundant descriptions may be avoided.

[Foam-Molded Product]

A foam-molded product according to the present disclosure includes a foam layer, and a skin layer covering the foam layer, wherein the maximum diameter of bubbles in the foam layer is 0.90 mm or less.

To address the problem of the appearance defects of foam-molded products, the inventors initially started examining this matter based on the assumption that the appearance defects are caused by insufficient foaming during the foam molding process. In general, insufficient foaming in the core-back method tends to cause the resin material not to be able to follow the mold, leading to an appearance defect. However, it has been found that, contrary to the foregoing, the appearance defects can be suppressed by keeping the size of the bubbles to 0.90 mm or less. Although the reason for this is not entirely clear, it is presumed that the generation of dents on the surface is suppressed when the size of the bubbles in the foam layer is relatively uniform.

Figure 1B:
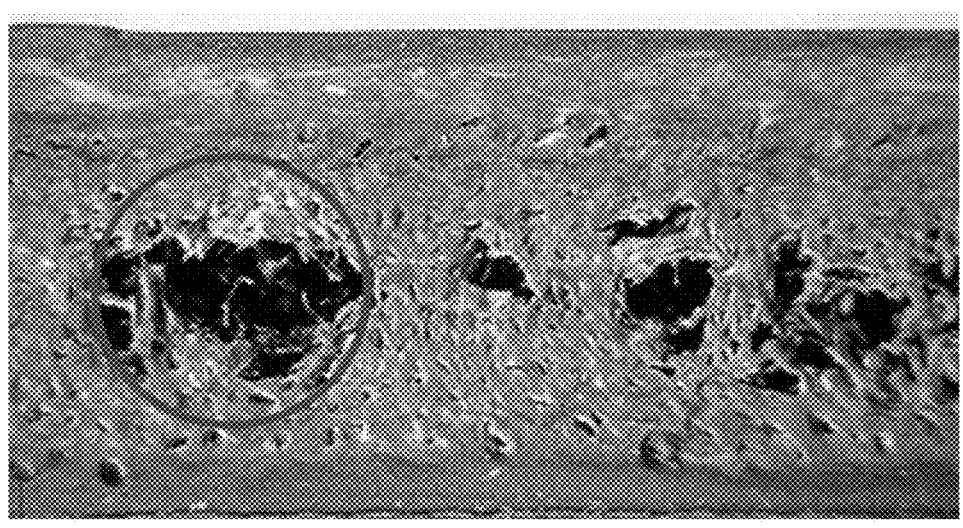
FIG. 1B is a cross-sectional view of a foam-molded product containing bubbles having a bubble diameter of larger than 0.90 mm.

The relationship between the maximum diameter of the bubbles in the foam layer and appearance defects will be explained in reference to FIGS. 1A and 1B. FIG. 1A is a cross-sectional view of a foam-molded product in an embodiment of the present disclosure. In FIG. 1A, the maximum diameter of the bubbles in the foam layer is 0.20 mm or less, and the average diameter of the bubbles is 0.10 mm. In the foam-molded product shown in FIG. 1A, appearance defects are suppressed. On the other hand, FIG. 1B is a cross-sectional view of a foam-molded product having a foam layer that contains a bubble having a bubble diameter of 0.93 mm. The foam-molded product shown in FIG. 1B has dents on the surface, causing an appearance defect.

The foam-molded product includes a foam layer, and a skin layer covering the foam layer. The foam layer is a layer formed by the foaming of a resin material, and the skin layer is a layer formed by the resin material cooling and solidifying. The foam layer is a layer formed by foam-molding a resin material in a mold filled therewith, and the skin layer is a layer formed by the resin material cooling and solidifying, and is a layer in which the percentage of bubbles is lower than in the foam layer. The foam-molded product may be one produced by the method for manufacturing a foam-molded product described later.

The maximum diameter of the bubbles in the foam layer of the foam-molded product according to the present disclosure is 0.90 mm or less, preferably 0.50 mm or less, more preferably 0.40 mm or less, and further preferably 0.20 mm or less. The minimum value of the maximum diameter of the bubbles is not particularly limited, and from the viewpoint of sufficient foaming, the maximum diameter of the bubbles may be 0.02 mm or more, 0.05 mm or more, or 0.10 mm or more.

The maximum diameter of the bubbles in the foam-molded product is the maximum major axis of the bubbles when an arbitrary cross section obtained by cutting the foam-molded product in the thickness direction is observed using a 3D measurement device (magnification: ×50). Here, the cross section of the foam-molded product is a cross section cut along the direction of the core-hack process when the core-back process of the mold is performed in the foaming process described later.

The maximum diameter of the bubbles can be adjusted by adjusting the degree of foaming of the resin material, adjusting the extent of the core-back process, and the like.

The average diameter of the bubbles in the foam layer of the foam-molded product is preferably from 0.02 mm to 0.15 mm and more preferably from 0.05 mm to 0.10 mm. When the average diameter of the bubbles in the foam layer is in the foregoing ranges, the appearance defects tend to be more favorably suppressed.

The average diameter of the bubbles is determined as the average value of the major diameters of 30 bubbles by, with a 3D measurement device (magnification: ×50), observing an arbitrary cross section obtained by cutting the foam-molded product in the thickness direction. The average diameter of the bubbles can be adjusted by controlling the degree of the foaming of the resin material, adjusting the extent of the core-back process, and the like.

The thickness of the foam layer in the foam-molded product is not particularly limited, and may be determined in accordance with the target thickness of the foam-molded product. For example, the average thickness of the foam layer of the foam-molded product may be from 0.5 mm to 4.2 mm, or from 1.0 mm to 4.0 mm. When a foam-molded product is produced by the core-back method, the thickness of the foam layer is defined as the thickness of the foam layer along the moving direction of the core-back process. The thickness of the foam layer may vary depending on the location of the foam-molded product.

The thickness of the skin layer of the foam-molded product is not particularly limited. The average thickness of the skin layer is preferably from 0.3 mm to 0.7 mm, and more preferably from 0.3 mm to 0.6 mm. The thickness of the skin layer can be adjusted by, for example, adjusting the temperature of the mold that forms the cavity. In general, the thickness of the skin layer of foam-molded products formed by foam molding is technically about 0.3 mm or more. Further, when the average thickness of the skin layer is 0.7 mm or less, a sufficient amount of resin material tends to be subjected to foaming, which is preferable from the viewpoints of weight reduction and suppression of an appearance defect. Further, by configuring the average thickness of the skin layer to be 0.3 mm to 0.7 mm, an appropriate thickness of the foam layer tends to be able to be secured, and a lightweight foam-molded product in which the appearance defects are further favorably suppressed tends to be able to be produced.

The average thicknesses of the foam layer and the skin layer of the foam-molded product are determined as average values of the thicknesses at five randomly selected locations by cross-sectional observation. As shown in FIGS. 1A and 1B, the boundary between the skin layer and the foam layer is visible.

Hereinafter, the resin material used for producing the foam-molded product will be described in detail.

Resin Material

The resin material is preferably a resin material containing a resin and a foaming agent, and may contain other components such as additives as necessary.

Examples of the resin used for the resin material include at least one selected from the group consisting of a polyethylene-based resin, a polypropylene-based resin (PP), a composite polypropylene-based resin (PPC), a polystyrene-based resin, a polyethylene terephthalate-based resin, a polyvinyl alcohol-based resin, a vinyl chloride-based resin, an ionomer-based resin, a polyamide-based resin, an acrylonitrile-butadiene-styrene copolymer resin (ABS), a polycarbonate-based resin, and a polyphenylene sulfide resin (PPS). In particular, at least one selected from the group consisting of a polypropylene-based resin (PP), a composite polypropylene-based resin (PPC), and an acrylonitrile-butadiene-styrene copolymer resin (ABS) is preferable.

Examples of the foaming agent include an organic foaming agent, such as azodicarbonamide, and an inorganic foaming agent, such as sodium hydrogen carbonate (also known as sodium bicarbonate or baking soda). In foam molding of automobile interior parts, an organic foaming agent is preferable from the viewpoint of improving environmental test performance, coating film performance (e.g., heat resistance), and the like.

Examples of the organic foaming agent include azodicarbonamide (ADCA), N, N-dinitrosopentamethylenetetramine (DPT), 4,4'-oxybisbenzenesulfonylhydrazide (OBSH), and hydrazodicarbonamide (HDCA), and azodicarbonamide (ADCA) is preferable. In particular, in the case of producing exterior products, it is preferable to use azodicarbonamide (ADCA), which contains almost no water in the decomposition product.

The content of azodicarbonamide (ADCA) with respect to the total amount of the foaming agent is preferably 50% by mass or more, more preferably 80% by mass or more, further preferably 90% by mass or more, and particularly preferably 95% by mass or more.

The decomposition temperature of the foaming agent is preferably from 50° C. to 250° C., and more preferably from 50° C. to 220° C. Depending on the manner of use, the decomposition temperature of the foaming agent may be from 130° C. to 250° C.

The content of the foaming agent in the resin material is preferably determined appropriately in accordance with the type of the foaming agent and the like. For example, when azodicarbonamide (ADCA) is used as the foaming agent, the content of azodicarbonamide (ADCA) in the resin material is preferably in the range of from 0.05% by mass to 0.5% by mass, and more preferably in the range of from 0.1% by mass to 0.4% by mass, from the viewpoints of foaming property, moldability and coating performance. The content of ADCA means the content in the mixture (composition) before supplying the mixture to the cylinder of the injection device described later.

The resin material may contain components other than the resin and the foaming agent. For example, the resin material may contain a filler, glass fiber, carbon fiber, and the like.

The resin material preferably contains a polypropylene resin having a branched chain, from the viewpoint of increasing the crystallization peak temperature and melt tension and the like of the foam-molded product. The resin material more preferably contains a polypropylene resin having a branched chain together with a polypropylene resin as the above-described resin.

In the case in which the resin material contains a polypropylene resin having a branched chain, the content of the polypropylene resin having a branched chain is preferably 4% by mass or more, more preferably 6% by mass or more, and further preferably 8% by mass or more, with respect to the total amount of the resin material.

In the case in which the resin material contains a polypropylene resin having a branched chain, the content of the polypropylene resin having a branched chain may be 20% by mass or less, or 16% by mass or less.

The melt flow rate (MFR) of the polypropylene resin having a branched chain at 230° C. is preferably 35 g/10 minutes or more, more preferably 40 g/10 minutes or more, and further preferably 50 g/10 minutes or more.

The MFR of the polypropylene resin having a branched chain at 230° C. may be 100 g/10 minutes or less, or 80 g/10 minutes or less.

The MFR is a value measured at 230° C. and a load of 2.16 kg (i.e., a load of 21.18 N) in accordance with JIS K7210-1 (2014).

[Use of Foam-Molded Product]

The use of the foam-molded product manufactured by the manufacturing method according to the present disclosure is not particularly limited, and the foam-molded product may be suitably used for, for example, an automobile interior part, such as a console box, a door trim, a deck side trim, a back door trim, or an instrument panel; or an automobile exterior part, such as an arch molding, a rocker molding, and a side panel. In particular, since appearance defects are suppressed in the foam-molded product according to the present disclosure, the foam-molded product may be suitably used for an automobile interior or exterior part that is not painted.

[Method for Manufacturing Foam-Molded Product]

A method for manufacturing a foam-molded product according to the present disclosure includes: injecting a resin material into a cavity of a mold to fill the cavity with the resin material (herein also referred to as an injection process); and expanding a volume of the cavity to foam the resin material in the cavity (herein also referred to as a foaming process), in which: the foam-molded product after molding includes a foam layer, which includes bubbles, and a skin layer covering the foam layer, the skin layer having an average thickness of from 0.3 mm to 0.7 mm, and the expanding of the volume of the cavity includes performing a core-back process of the mold such that a thickness of the foam-molded product after molding is within ±0.2 mm of a predetermined target thickness.

The details of the resin material are as described above.

In the method for manufacturing a foam-molded product according to the present disclosure, by performing a core-back process of the mold in the foaming process such that the thickness is within ±0.2 mm of the target thickness, the foaming state can be controlled, whereby appearance defects can be suppressed. The target thickness refers to a thickness of the foam-molded product intended to be obtained. The controlled range of ±0.2 mm in the method for manufacturing a foam-molded product according to the present disclosure is a range that is distinguished from general design tolerances, from the viewpoint that the range technically ensures the suppression of an appearance defect, and is often smaller than general design tolerances. It is presumed that, since the foam-molded product obtained by the manufacturing method according to the present disclosure has a stable forming state, in other words, the size of the bubbles is relatively uniform with reduced generation of excessively large bubbles, the occurrence of appearance defects can be suppressed. Therefore, the method for manufacturing a foam-molded product according to the present disclosure can technically ensure the quality even in a case in which complicated inspections such as cross-sectional observations of the foam-molded product are not carried out.

Since the average thickness of the skin layer of the foam-molded product after molding is from 0.3 mm to 0.7 mm, the thickness of the foamed layer of the foam-molded product to be formed is calculated as a value obtained by subtracting the average thickness of the skin layer from the target thickness. By adjusting the distance utilized in the core-back process to adjust the degree of foaming such that the thickness of the foam layer of the foam-molded product is the value calculated in this manner, the generation of excessively large bubbles can be suppressed, whereby appearance defects can be suppressed. Therefore, it is presumed that, by controlling the distance utilized in the core-back process to within +0.2 mm of the target thickness of the foam-molded product, suppression of appearance defects can be technically ensured.

Controlling the distance utilized in the core-back process with the range of +0.2 mm can reduce the possibility that the bubbles grow too large as a result of an excessive core-back process, or the possibility that the resin material is detached from the mold, causing an appearance defect. Further, in contrast, it can reduce the possibility of insufficient foaming as a result of an insufficient core-back process, or the possibility of insufficient rigidity owing to the molded product being too thin.

In the method for manufacturing a foam-molded product according to the present disclosure, it is preferable that, by performing a core-back process of the mold such that the thickness of the foam-molded product after molding is within ±0.2 mm of the target thickness, the maximum diameter of the bubbles in the foam-molded product after the molding is kept to 0.90 mm or less, more preferably 0.50 mm or less, and further preferably 0.20 mm or less. The lower limit of the maximum diameter of the bubbles is not particularly limited, and from the viewpoint of sufficient foaming, the maximum diameter of the bubbles may be kept to 0.02 mm or more, may be kept to 0.05 mm or more, or may be kept to 0.10 mm or more. The maximum diameter of the bubbles can be adjusted by preliminary examining the relationship between the distance utilized in the core-back process and the maximum diameter of the bubbles using a predetermined resin.

The average diameter of the bubbles in the foam layer of the foam-molded product after molding is preferably from 0.02 mm to 0.15 mm, and more preferably from 0.05 mm to 0.10 mm. When the average diameter of the bubbles in the foam layer is in the foregoing ranges, the appearance defects tend to be more favorably suppressed.

Besides the foregoing, the details of the foam-molded product according to the present disclosure described above can be applied to the details of the foam-molded product manufactured by the method for manufacturing a foam-molded product according to the present disclosure.

Figure 2:
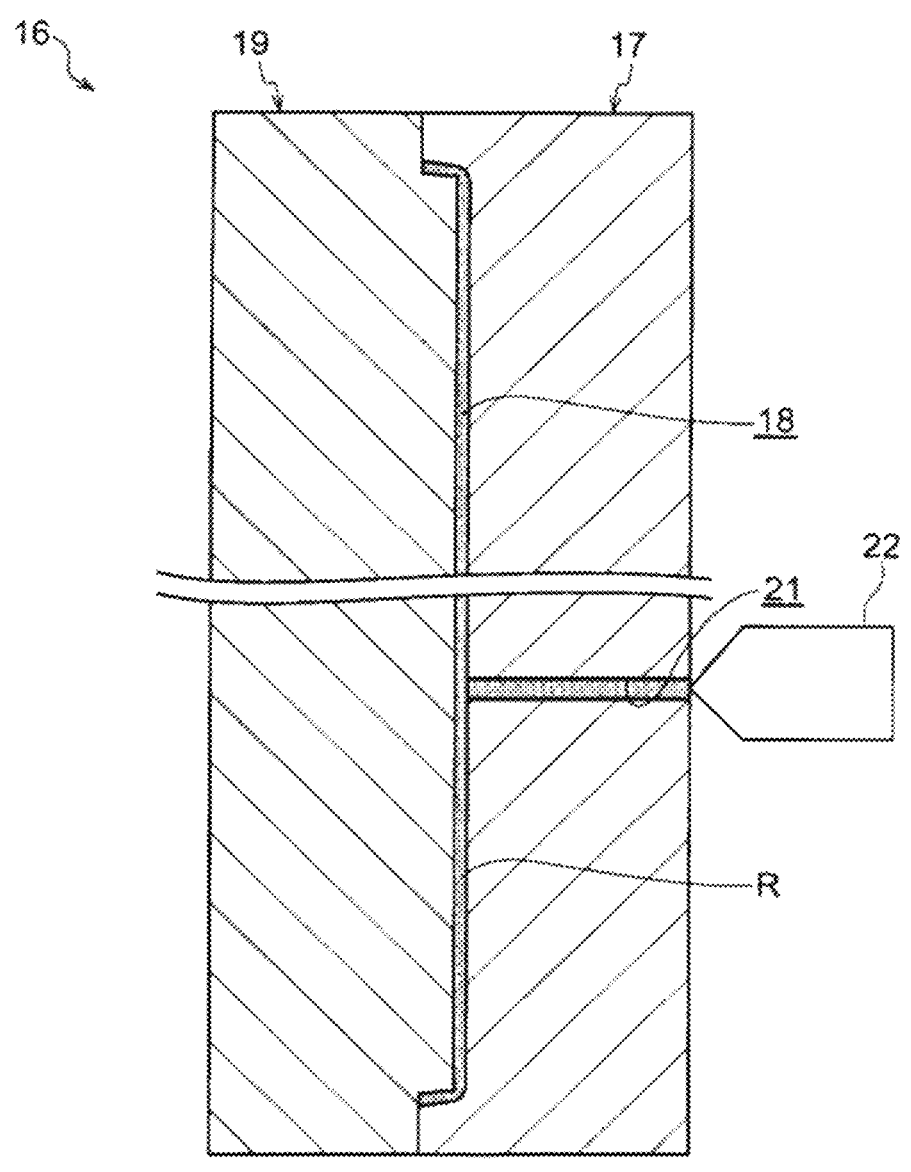
FIG. 2 is a schematic diagram illustrating a molding device provided with a mold.

To explain the method for manufacturing a foam-molded product according to the present disclosure, a schematic configuration diagram of an example of the molding device for the foam-molded product is shown in FIG. 2. Here, the method for manufacturing a foam-molded product according to the present disclosure is not limited to the configuration shown in FIG. 2.

FIG. 2 is a schematic configuration diagram of a molding devise applicable to the manufacture of a foam-molded product. The molding device 16 illustrated in FIG. 2 is provided with a fixed mold 17 and a movable mold 19 configured to be movable in the opening/closing direction with respect to the fixed mold 17, and to form a cavity 18, which is a gap between the fixed mold 17 and the movable mold 18.

Further, the molding device 16 is provided with a gate 21, which penetrates the fixed mold 17 to reach the cavity 18, and an injector 22, which injects a molten resin material R to fill the cavity 18 therewith through the gate 21. The injector 22 is provided with a hopper (supply unit), which is not illustrated, and a cylinder, which is not illustrated. In the injector 22, a mixture containing a resin, a foaming agent, and an additive and the like used as needed is supplied from the hopper (supply unit) to the cylinder, and is stirred in the cylinder by a screw or the like to form the resin material R, which is injected through the gate 21 to fill the cavity 18 at a predetermined pressure. Here, the injector 22 is not limited to the foregoing configuration as long as it can inject the molten resin material R through the gate 21 to fill the cavity 18 therewith.

In a case in which the resin material R contains a thermoplastic resin, the resin material R is supplied while being heated and fluidized.

Further, the temperature of the fixed mold 17 and the movable mold 19 is usually lower than that of the molten resin material R. Therefore, when the cavity 18 is filled with the resin material R, cooling and solidification start at the portions in contact with the fixed mold 17 and the movable mold 19, thereby forming a skin layer.

Next, the movable mold 19 is moved (core-back) by a predetermined amount in the opening direction (mold-opening direction) with respect to the fixed mold 17, thereby causing the resin material R that has not been solidified to foam, as a result of which a foam layer is formed. Thereafter, the fixed mold 17 and the movable mold 19 are opened, and the foam-molded product is detached from the movable mold 19, whereby the foam-molded product is obtained. In the method for manufacturing a foam-molded product according to the present disclosure, the core-back process of the mold is performed such that the thickness of the foam-molded product after the molding is within +0.2 mm of the predetermined target thickness in the foam-molded product after the molding, the thickness of the skin layer is from 0.3 mm to 0.7 mm.

[Method for Suppressing Appearance Defect of Foam-Molded Product]

A method for suppressing an appearance defect of a foam-molded product according to the present disclosure includes: injecting a resin material into a cavity of a mold to fill the cavity with the resin material (i.e., an injection process); and expanding a volume of the cavity to foam the resin material in the cavity (i.e., a foaming process), in which: the foam-molded product after molding includes a foam layer, and a skin layer covering the foam layer, the skin layer having an average thickness of from 0.3 mm to 0.7 mm, and the expanding of the volume of the cavity includes performing a core-back process of the mold such that a thickness of the foam-molded product after molding is within ±0.2 mm of a predetermined target thickness.

Similarly to the method for manufacturing a foam-molded product according to the present disclosure described above, this method can favorably suppress appearance defects of a foam-molded product. The above-described respective details of the method for manufacturing a foam-molded product according to the present disclosure and the foam-molded product according to the present disclosure can be applied to the details of each process of the method for suppressing an appearance defect of a foam-molded product and the details of the foam-molded product to be produced.

EXAMPLES

Hereinafter, the invention will be described in detail below by way of Examples. However, the invention is not limited to these Examples.

Example 1

A molded product was produced by foam injection molding using the core-back method, with the molding devise schematically illustrated in FIG. 2. The target thickness of the molded product was set to be 3.4 mm, based on which the distance utilized in the core-back process was determined. The thickness of the molded product after the molding was within ±0.2 mm of the target thickness. The average thickness of the skin layer was 0.5 mm.

Comparative Example 1

A molded product was produced in the same manner as in Example 1 except that the distance utilized in the core-back process was increased. The thickness of the molded product after the molding was larger than the target thickness set in Example 1 by more than 0.2 mm. The average thickness of the skin layer was 0.5 mm.

In visually examining the occurrence of appearance defects of the molded products after the molding in Example 1 and Comparative Example 1, no appearance defects were observed in Example 1 while appearance defects were observed in Comparative Example 1. Further, the cross sections obtained by cutting the molded products in the thickness direction were observed using a 3D measurement device (magnification: ×50), and the maximum diameters and the average diameters of the bubbles were determined by the above-described method.

Figure 3:
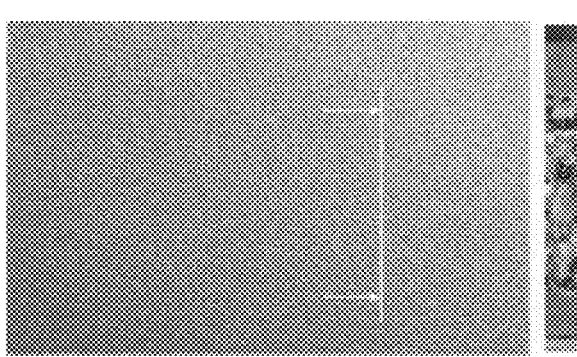
FIG. 3 shows the appearance and a cross-sectional view of the foam-molded product obtained in Example 1.
Figure 3:
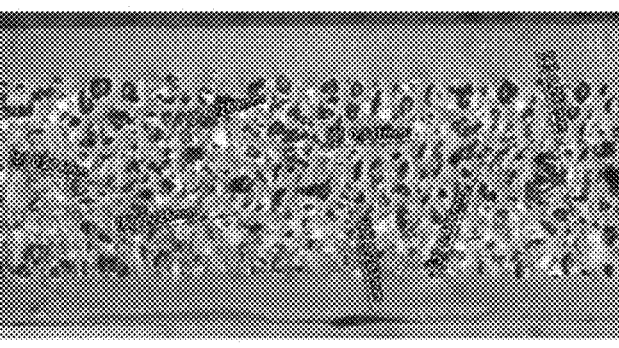

The appearance and a cross section of a portion at which no appearance defects were observed are shown in FIG. 3. The maximum diameter of the bubbles was 0.487 mm.

Further, in measuring the average diameter of the bubbles at a portion at which no appearance defects were observed (a portion different from the portion shown in FIG. 3), the average diameter of 30 bubbles was 0.08 mm.

Figure 4:
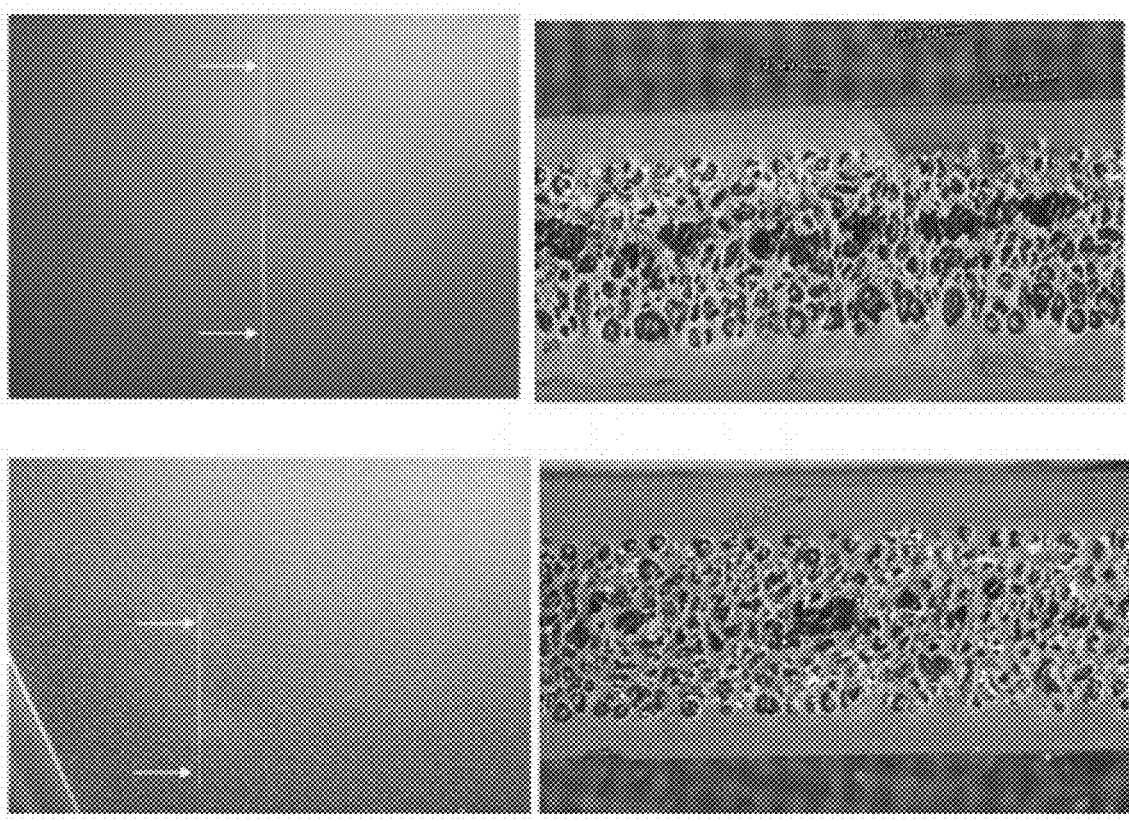
FIG. 4 shows the appearance and a cross-sectional view of the foam-molded product obtained in Comparative Example 1.

The appearances and cross-sectional views of two portions at which an appearance defect was observed in Comparative Example 1 are shown in FIG. 4. The maximum diameters of the bubbles were 1.116 mm and 1.039 mm, respectively.

As can be seen from the above, when the maximum diameter of the bubbles in a foam layer of a foam-molded product is 0.90 mm or less, appearance defects are suppressed.

The entire disclosure of Japanese Patent Application No. 2019-187117 is incorporated herein by reference in its entirety. All documents, patent applications, and technical standards described in the present disclosure are herein incorporated by reference to the same extent as if each individual document, patent application, or technical standard was specifically and individually indicated to be incorporated by reference.

REFERENCE SIGNS LIST 16 molding device
17 fixed mold
18 cavity
19 movable mold
21 gate
22 injector
R resin material

The invention claimed is:
1. An automobile interior or exterior part comprising a foam-molded product, the foam-molded product comprising a foam layer, which comprises bubbles, and a skin layer covering the foam layer, wherein:

the foam-molded product is a molded product of a resin material comprising at least one selected from the group consisting of a polypropylene resin having a branched chain and a melt flow rate of 35 g/10 minutes or more at 230° C., and an acrylonitrile-butadiene-styrene copolymer resin (ABS), the foam layer and the skin layer are made of the same material, a maximum diameter of the bubbles in the foam layer is from 0.05 to 0.20 mm, an average diameter of the bubbles in the foam layer is from 0.02 mm to 0.15 mm, and the skin layer has an average thickness of from 0.3 mm to 0.7 mm.

2. The automobile interior or exterior part according to claim 1, wherein the automobile interior or exterior part is an automobile exterior part.

3. The automobile interior or exterior part according to claim 1, wherein the automobile interior or exterior part is not painted on a surface thereof.

4. The automobile interior or exterior part according to claim 1, wherein the automobile interior or exterior part is at least one selected from the group consisting of a console box, a door trim, a deck side trim, a back door trim, an instrument panel, an arch molding, a rocker molding, and a side panel.

5. The automobile interior or exterior part according to claim 1, wherein a content of the polypropylene resin having a branched chain is 4% by mass or more with respect to the total amount of the resin material.

6. The automobile interior or exterior part according to claim 1, wherein the resin material further comprises an organic foaming agent.

7. The automobile interior or exterior part according to claim 6, wherein the organic foaming agent is azodicarbonamide.

8. The automobile interior or exterior part according to claim 1, wherein:

the average diameter of the bubbles in the foam layer is from 0.02 mm to 0.10 mm;

the maximum diameter of the bubbles in the foam layer is from 0.10 mm to 0.20 mm; and the foam layer has an average thickness of from 1.0 mm to 4.0 mm.

9. A method for manufacturing an automobile interior or exterior part comprising a foam-molded product, the method comprising:

injecting a resin material into a cavity of a mold to fill the cavity with the resin material; and expanding a volume of the cavity to foam the resin material in the cavity to form the foam-molded product of the automobile interior or exterior part, wherein:

the foam-molded product is a molded product of the resin material comprising at least one selected from the group consisting of a polypropylene resin having a branched chain and a melt flow rate of 35 g/10 minutes or more at 230° C., and an acrylonitrile-butadiene-styrene copolymer resin (ABS), the foam-molded product after molding comprises a foam layer, which comprises bubbles, and a skin layer covering the foam layer, the skin layer has an average thickness of from 0.3 mm to 0.7 mm, and an average diameter of bubbles in the foam layer is from 0.02 mm to 0.15 mm, the foam layer and the skin layer are made of the same material, and the expanding of the volume of the cavity comprises performing a core-back process of the mold such that a thickness of the foam-molded product after molding is within +0.2 mm of a predetermined target thickness, as a result of which a maximum diameter of the bubbles in the foam-molded product is from 0.05 to 0.20 mm.

10. A method for suppressing an appearance defect of an automobile interior or exterior part comprising a foam-molded product, the method comprising:

injecting a resin material into a cavity of a mold to fill the cavity with the resin material; and expanding a volume of the cavity to foam the resin material in the cavity to form the foam-molded product of the automobile interior or exterior part, wherein:

the foam-molded product is a molded product of the resin material comprising at least one selected from the group consisting of a polypropylene resin having a branched chain and a melt flow rate of 35 g/10 minutes or more at 230° C., and an acrylonitrile-butadiene-styrene copolymer resin (ABS), the foam-molded product after molding comprises a foam layer, which comprises bubbles, and a skin layer covering the foam layer, the skin layer has an average thickness of from 0.3 mm to 0.7 mm, and an average diameter of bubbles in the foam layer is from 0.02 mm to 0.15 mm, the foam layer and the skin layer are made of the same material, and the expanding of the volume of the cavity comprises performing a core-back process of the mold such that a thickness of the foam-molded product after molding is within ±0.2 mm of a predetermined target thickness, as a result of which a maximum diameter of the bubbles in the foam-molded product is from 0.05 to 0.20 mm.

* * * * *